A. S. KROTZ.
DETACHABLE PLOWSHARE.
APPLICATION FILED OCT. 19, 1918.
1,388,652. Patented Aug. 23, 1921.
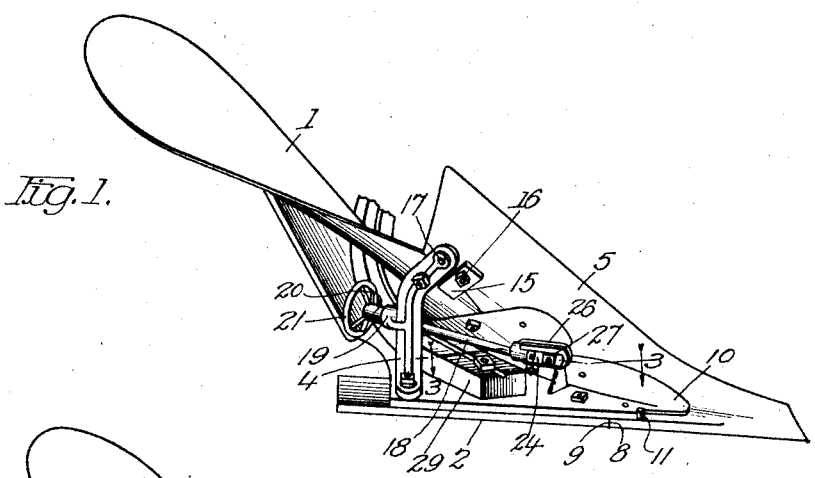
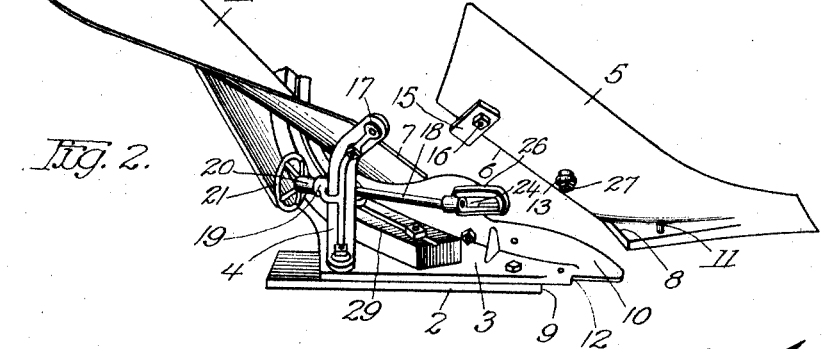
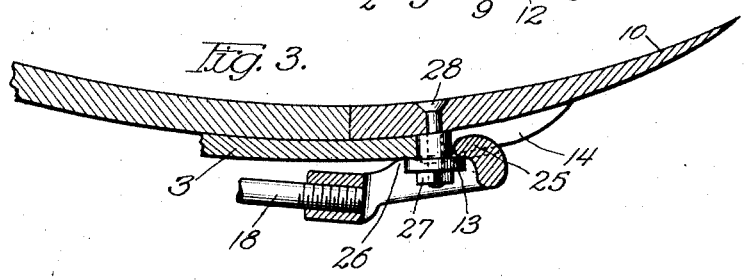
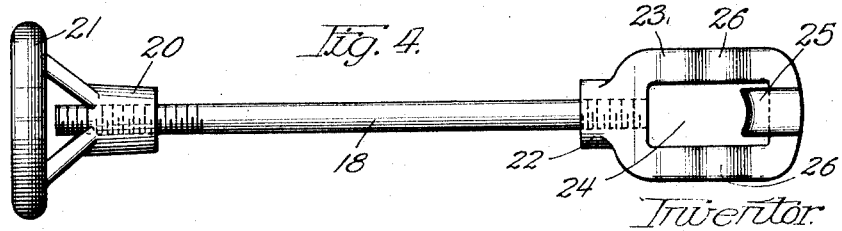

UNITED STATES PATENT OFFICE.

ALVARO S. KROTZ, OF JANESVILLE, WISCONSIN, ASSIGNOR TO JANESVILLE MACHINE COMPANY, OF JANESVILLE, WISCONSIN, A CORPORATION OF WISCONSIN.

DETACHABLE PLOWSHARE.

1,388,652.  Specification of Letters Patent.  Patented Aug. 23, 1921.

Application filed October 19, 1918. Serial No. 258,883.

*To all whom it may concern:*

Be it known that I, ALVARO S. KROTZ, a citizen of the United States of America, and resident of Janesville, Wisconsin, have invented a certain new and useful Improvement in Detachable Plowshares, of which the following is a specification.

This invention relates to what are commonly called quick detachable plow shares for plows. With a construction of this kind the plow share can be easily and quickly removed for sharpening, or for the purpose of substituting one share for another.

Generally stated, the object of the invention is to provide novel and improved means for detachably connecting the plow share to the frog of the plow, and to accurately and tightly adjust the share to the edges of the moldboard, and whereby the share is more satisfactorily and more rigidly held in place than heretofore, as will hereinafter more fully appear.

It is also an object to provide certain details and features of construction tending to increase the general efficiency and the desirability of a quick detachable plow share of this particular character.

To these and other useful ends the invention consists in matters hereinafter set forth and claimed and shown in the accompanying drawings, in which—

Figure 1 is a perspective of a complete plow bottom having a quick detachable share and mechanism for holding it in place, embodying the principles of the invention, showing the plow bottom turned over on its landside.

Fig. 2 is a similar view showing the plow share detached or disconnected.

Fig. 3 is a detail sectional view, showing the connection by which the plow share is effectively drawn into position relatively to the moldboard and frog.

Fig. 4 is a top plan view of the rod and hand wheel and head forming the connection by which the plow share is rigidly and accurately drawn into position, and whereby the share may be very quickly released and disconnected.

As thus illustrated, the invention comprises a moldboard 1 of any suitable character, and a landside 2 of the usual or ordinary form, held together in any suitable manner by the frog 3, the latter having a brace 4 extending from its heel or rear corner to the under side of the moldboard. The plow share 5 may be of any suitable, known, or approved form, but preferably has a straight edge 6 to engage the straight edge 7 of the moldboard, and an edge 8 which engages the front edge 9 of the landside, so that the forward end portion 10 of the frog extends under the plow share. A pin 11 on the under side of the plow share engages the notch 12 in the frog, and a head 13 on the under side of the plow share enters the notch 14 in the forward edge of the frog. A small piece 15 is secured by a bolt 16 to the under side of the plow share adjacent the upper end portion 17 of the brace 4, and extends under the moldboard a distance. The portion 17 extends under the plow share, and thus the rear end portion of the plow share is locked in accurate relation at the edge of the moldboard.

For the purpose of effectively drawing the plow share into position, and for retaining it very rigidly in such position, a rod 18 is inserted through a bearing 19 in the brace 4, and has its rear end portion threaded to receive the nut 20 which has a hand wheel 21 for the rotation thereof. The other end portion of said rod is threaded and screwed into the socket portion 22 of the yoke 23, which latter has an opening 24 to receive the head 13, and a hook 25 to engage under said head (see Fig. 3), thereby to pull the plow share into position when the hand wheel is rotated. It will also be seen that the sides of the hook 23 are provided with lugs or projections 26 that form a protuberance to bear against the under surface of the frog. The angle of the rod 18, relatively to the yoke 23, is such that when the hand wheel is rotated, the lugs 26 form a fulcrum for the yoke 23, so that the tendency of the latter is to tilt on said fulcrum, thereby exerting such a pull on the head 13 that the under surface of the plow share is drawn tightly against the upper surface of the frog. In addition, of course, the straight edge 6 of the plow share is drawn tightly against the straight edge 7 of the moldboard, but by reason of this lever-like action of the yoke 23, when the nut 20 is tightened by rotation of the hand wheel, the plow share is also held tightly upon the upper surface of the frog— that is to say, upon that portion of the frog which projects forward below the plow share. Preferably, the head 13 is formed separately and is held in place by the nut 27 on the end of the bolt 28, whereby in case of breakage of the head, it can be readily replaced.

The lower portion 29 of the plow beam can be secured to the frog in any suitable or desired manner, and the beam itself may be of any ordinary or suitable character.

With the foregoing construction, it will be seen that the plow share 5 can be very quickly detached, merely by sufficient adjustment of the nut 20 by its hand wheel to disengage the hook 25 from the head 13, for it is not necessary to detach the nut and hand wheel from the rod to effect this disconnection of the plow share from the frog and moldboard. At the same time, however, as explained, the connecting and disconnecting mechanism is of such character that it very effectively draws the share into position, and rigidly holds it in such position, very largely as the result of the fulcruming of the yoke 23 and the lever-like effect produced thereby, as shown and explained.

It will be seen that the rod 18 is preferably or desirably flexible, and is resilient or springy, as it is the flexing of the rod, when the hand wheel is finally tightened, that causes the yoke to fulcrum on the frog, the pull on the rod causing the yoke to attempt to straighten out or assume a position in alinement with the rod. The initial pull on the rod, of course, serves to bring the plow share up into position, and to bring its edge against the edge of the moldboard, and this occurs before any leverage is exerted by the yoke, whereby the fulcruming of the yoke on its lugs 26 does not occur until the final tightening action, and this flexes the rod. Consequently, when it is desired to remove the plow share, the first effect of the adjustment of the hand wheel is to allow the rod to spring back into its normal or straight condition, and this serves to loosen the plow share, so that the latter is then easily removed after a little further adjustment of the hand wheel.

What I claim as my invention is:—

1. A quick detachable plow share construction for plows, comprising a frog and a moldboard secured thereto, a plow share, and mechanism including an element formed with a protuberance which fulcrums and slides on the smooth under surface of the frog to draw the plow share firmly into position, and adapted to permit detachment of the share from said element merely by a reverse adjustment of the mechanism, said frog having a portion with a notch which extends under the plow share, with a projection on the under side of the plow share to enter said notch, and said element comprising a yoke with a hook to engage said projection, and having portions which engage the under side of the frog to provide the fulcrum therefor, a rod connected to said yoke, a bearing for said rod, and a nut on said rod to engage said bearing, the rod being disposed at an angle to the yoke, so that tightening of the nut causes the yoke to operate as a lever on its said fulcrum, thereby to hold the under side of the plow share tightly against the upper surface of the frog, as well as to draw the plow share against the edge of the moldboard.

2. A quick detachable plow share construction for plows, comprising a frog and a mold board secured thereto, a plow share and mechanism including an element which fulcrums on the frog to draw the plow share firmly into position, said frog having a portion with a notch which extends under the plow share, with a projection on the under side of the plow share to enter said notch, and said element comprising a yoke with a hook to engage the under side of the frog to provide the fulcrum therefor, a rod rigidly connected to said yoke, a bearing for said rod, and a nut on said rod to engage said bearing, the rod being disposed at an angle to the yoke, so that tightening of the nut causes the yoke to operate as a lever on its said fulcrum, and whereby the rod is bowed toward the frog, thereby to hold the under side of the plow share tightly against the upper surface of the frog, as well as to draw the plow share against the edge of the mold-board.

3. A quick detachable plow share construction for plows, comprising a frog formed with an opening in the forward portion thereof, a mold board secured to the frog, a plow share provided on its under side with a head adapted to enter said opening, a lever formed to fulcrum between its ends on the frog and provided at one end with means adapted to enter said opening to operatively engage said head, said lever having an opening through which said head can pass readily to permit removal of the plow share, and adjustable mechanism connected for pulling on the other end of said lever, so that said lever tilts about its fulcrum, thereby to cause the tightening of the share on the frog.

4. A quick detachable plow share construction for plows, as specified in claim 3, said mechanism including a rod which is rigidly connected to said member and which is flexible and maintained under tension to permit the tilting action of the member.

5. A quick detachable plow share construction for plows, as specified in claim 3, said head having a flange, said member being in the form of a yoke having an opening for said head, and said means having a hook which is rigid with the yoke and which enters said opening to engage between the share and said flange.

6. In a plow, a structure forming the body of the plow, a plow share, a lever formed to fulcrum between its ends on said body structure, means on the share to detachably engage one end of said lever, so that said lever and share are separable without adjustment of said engaging means, and mechanism for tilting said lever about its intermediate axis to draw said plow share into position on said body structure.

7. A structure as specified in claim 6, said engaging means comprising a removable head on a bolt, and said lever having an opening through which said head can pass readily to engage and disengage said lever.

8. A structure as specified in claim 6, said mechanism comprising a rod rigidly secured to said lever, so that said rod is bowed toward the plow and held under tension by the tilting of said lever.

ALVARO S. KROTZ.